United States Patent
Gattere et al.

(10) Patent No.: US 10,488,200 B2
(45) Date of Patent: Nov. 26, 2019

(54) MEMS GYROSCOPE HAVING A HIGH STABILITY WITH RESPECT TO TEMPERATURE AND HUMIDITY VARIATIONS

(71) Applicant: STMICROELECTRONICS S.R.L., Agrate Brianza (IT)

(72) Inventors: Gabriele Gattere, Castronno (IT); Alessandro Tocchio, Milan (IT); Carlo Valzasina, Gessate (IT)

(73) Assignee: STMICROELECTRONICS S.R.L., Agrate Brianza (IT)

(*) Notice: Subject to any disclaimer, the term of this patent is extended or adjusted under 35 U.S.C. 154(b) by 219 days.

(21) Appl. No.: 15/466,722

(22) Filed: Mar. 22, 2017

(65) Prior Publication Data

US 2018/0094929 A1 Apr. 5, 2018

(30) Foreign Application Priority Data

Sep. 30, 2016 (IT) .................. 102016000098502

(51) Int. Cl.
*G01C 19/574* (2012.01)
*G01C 19/5726* (2012.01)
*G01C 19/5755* (2012.01)

(52) U.S. Cl.
CPC ....... *G01C 19/574* (2013.01); *G01C 19/5726* (2013.01); *G01C 19/5755* (2013.01)

(58) Field of Classification Search
CPC .................. G01C 19/574; G01C 19/5726

USPC ........................................ 73/504.12
See application file for complete search history.

(56) References Cited

U.S. PATENT DOCUMENTS

| 2005/0022596 | A1 | 2/2005 | Lehureau et al. |
| 2010/0000289 | A1* | 1/2010 | Prandi ................ G01C 19/5726 73/1.37 |
| 2011/0041609 | A1 | 2/2011 | Clark et al. |
| 2017/0285061 | A1* | 10/2017 | Tocchio ............... G01P 1/006 |
| 2018/0094929 | A1* | 4/2018 | Gattere ................ G01C 19/574 |

FOREIGN PATENT DOCUMENTS

| JP | 2012-255668 A | 12/2012 |
| JP | 2012255668 A | * 12/2012 |

* cited by examiner

*Primary Examiner* — Tarun Sinha
(74) *Attorney, Agent, or Firm* — Seed Intellectual Property Law Group LLP (57) ABSTRACT

A MEMS device including a main die that may be coupled to a secondary die, which forms a frame, and at least one first mobile mass elastically coupled to the frame, the main die forming: a driving stage that drives the first mobile mass so that it oscillates, parallel to a first direction, with frequency-modulated displacements; and a processing stage, which generates an output signal indicating an angular velocity of the MEMS device as a function of displacements parallel to a second direction that are made by the first mobile mass, when driven by the driving stage, on account of a Coriolis force.

18 Claims, 6 Drawing Sheets

MEMS GYROSCOPE HAVING A HIGH STABILITY WITH RESPECT TO TEMPERATURE AND HUMIDITY VARIATIONS

BACKGROUND

Technical Field

The present disclosure relates to a MEMS gyroscope having a high stability with respect to undesirable phenomena such as, for example, variations of temperature and/or humidity. As is known, so-called MEMS gyroscopes are today available, which are sensors of angular velocity capable of detecting an external stimulus due to the Coriolis force. The Coriolis force is an inertial force that acts on a mobile mass that moves with respect to a rotating reference frame, this force being proportional to the velocity of the mobile mass and to the angular velocity of the reference frame.

Description of the Related Art

Figure 1:
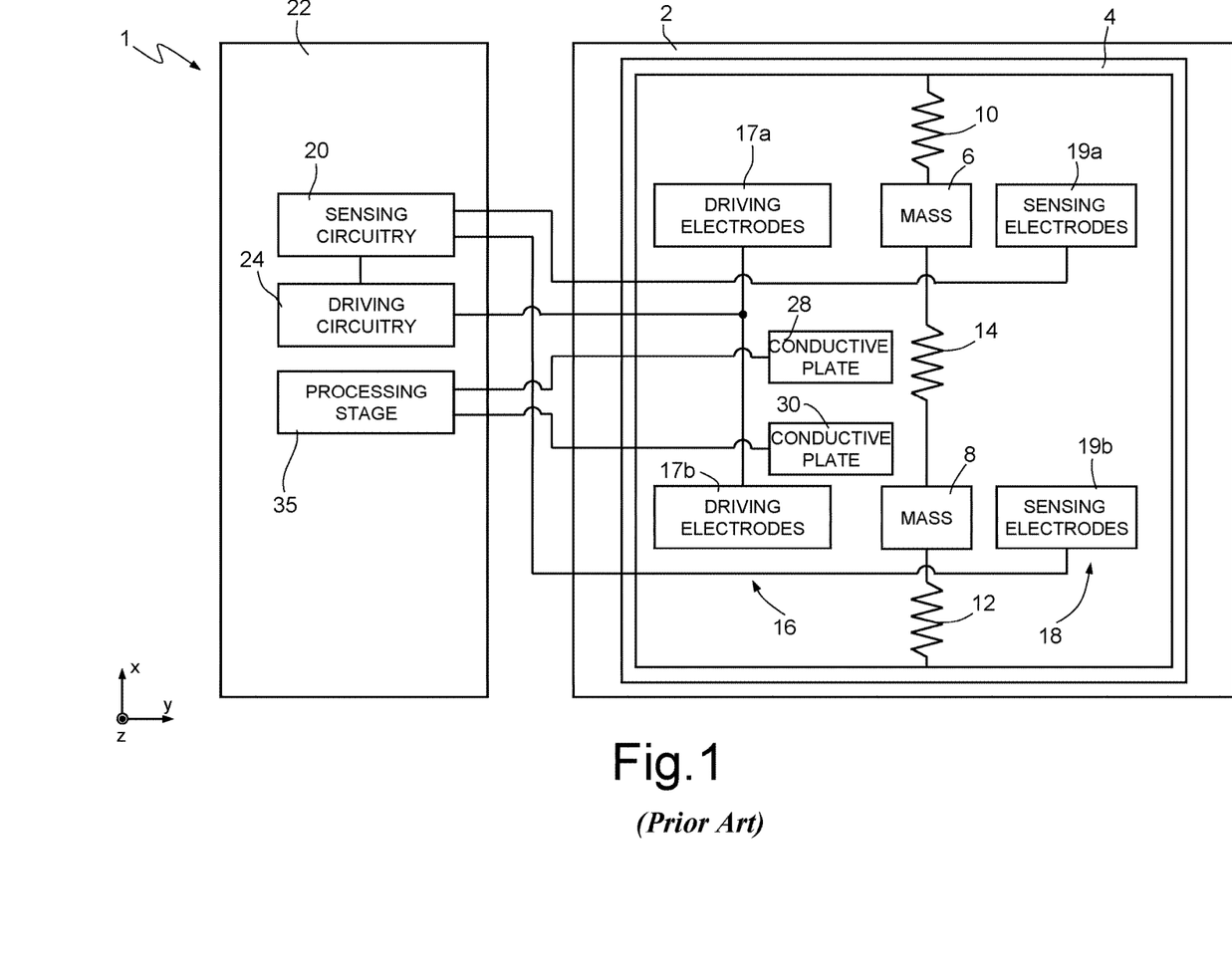
FIG. 1 shows a block diagram of a MEMS gyroscope of a known type.

As illustrated in FIG. 1, typically a MEMS gyroscope 1 is formed by a first die 2 of semiconductor material (typically, silicon), which forms a frame 4, mechanically coupled are to which a first mobile mass 6 and a second mobile mass 8, which are also of semiconductor material.

The first and second mobile masses 6, 8 are mechanically coupled to the frame 4 by a first system of springs 10 and a second system of springs 12, respectively, these systems of springs being formed, for example, by suspended and flexible portions of semiconductor material (for example, with the form of beams), set between the frame 4 and the respective mobile mass. For instance, assuming an orthogonal reference system xyz, the first and second systems of springs 10, 12 are designed to enable the first and second mobile masses 6, 8 to move in a direction parallel to the axis x, also referred to as driving direction. Furthermore, the first and second mobile masses 6, 8 are mechanically coupled together through a coupling system 14, which is, for example, considered equivalent to a corresponding spring that operates parallel to the axis x.

As shown once again in FIG. 1, the MEMS gyroscope 1 further comprises a system of driving electrodes 16, which includes a first set of driving electrodes 17a and a second set of driving electrodes 17b, and a system of sensing electrodes 18, which includes a first set of sensing electrodes 19a and a second set of sensing electrodes 19b.

The first set of driving electrodes 17a comprises corresponding electrodes (which are not shown in detail), which are fixed with respect to the frame 4 and have shapes and arrangements such as to cause, when subjected to corresponding voltages, an oscillation of the first mobile mass 6, parallel to the axis x. The first mobile mass 6 is thus made to oscillate by electrostatic forces that are set up between the first mobile mass 6 and the first set of driving electrodes 17a. For instance, the first set of driving electrodes 17a may comprise a first subset of electrodes and a second subset of electrodes (not shown) such that, when they are subjected to mutually opposite a.c. voltages, the first mobile mass 6 oscillates parallel to the axis x. In this connection, in FIG. 2 the arrangement of the block that represents the first set of driving electrodes 17a with respect to the block that represents the first mobile mass 6 does not have any geometrical implication. Similar considerations apply to the blocks that represent the first set of sensing electrodes 19a and, as regards the second mobile mass 8, the blocks that represent the second set of driving electrodes 17b and the second set of sensing electrodes 19b.

The second set of driving electrodes 17b comprises corresponding electrodes (not shown in detail), which are fixed with respect to the frame 4 and have shapes and arrangements such as to cause, when subjected to corresponding voltages, an oscillation of the second mobile mass 8 parallel to the axis x. The second mobile mass 8 is thus made to oscillate by electrostatic forces that are set up between the second mobile mass 8 and the second set of driving electrodes 17b. For instance, the second set of driving electrodes 17b may comprise a respective first subset of electrodes (not shown) and a respective second subset of electrodes (not shown), these first and second subsets of electrodes being such that, when they are subjected to mutually opposite a.c. voltages, the second mobile mass 8 oscillates parallel to the axis x.

The first set of sensing electrodes 19a comprises corresponding electrodes (not shown in detail), which are fixed with respect to the frame 4 and form a sort of plate, which defines, together with the first mobile mass 6, a first variable capacitor, the capacitance of which is a function of the position of the first mobile mass 6.

The second set of sensing electrodes 19b comprises corresponding electrodes (not shown in detail), which are fixed with respect to the frame 4 and form a sort of further plate, which defines, together with the second mobile mass 8, a second variable capacitor, the capacitance of which is a function of the position of the second mobile mass 8.

The MEMS gyroscope 1 further comprises external sensing circuitry 20, which is formed, for example, in a second die 22, fixed with respect to the first die 2. In addition, the MEMS gyroscope 1 comprises external driving circuitry 24, which is also formed in the second die 22.

In detail, the external sensing circuitry 20 is electrically connected to the first and second sets of sensing electrodes 19a, 19b and generates a first sensing signal, which is a function of the capacitance of the first and second variable capacitors and thus indicates the positions of the first and second mobile masses 6, 8.

The external driving circuitry 24 is electrically coupled to the external sensing circuitry 20 for receiving the first sensing signal. In addition, the external driving circuitry 24 is electrically coupled to the system of driving electrodes 16 and thus to the first and second sets of driving electrodes 17a, 17b.

In use, the external driving circuitry 24 supplies to the first and second sets of driving electrodes 17a, 17b the aforementioned voltages that enable the first and second mobile masses 6, 8 to be kept in oscillation. More in particular, the voltages generated by the driving circuitry 24 are such that the first and second mobile masses 6, 8 oscillate with a same frequency $f_d$, but with opposite phases. The frequency $f_d$ is equal, to a first approximation, to the frequency of mechanical resonance of the mechanical system including the first and second mobile masses 6, 8, the first and second systems of springs 12 and the coupling system 14, referred to in what follows as the "oscillating system". In other words, a mode of oscillation of the oscillating system is excited, this mode being the one in which the first and second mobile masses 6, 8 oscillate in phase opposition parallel to the axis x, i.e., with velocities (and positions) phase-shifted by 180° and thus with opposite directions.

In particular, the external driving circuitry 24 generates the aforementioned voltages as a function of the first sensing signal, as described in what follows. In even greater detail, the external driving circuitry 24 may generate, for example, a first driving voltage $V_{d1}$ and a second driving voltage $V_{d2}$, which are of an a.c. type and in phase opposition. In this case, the first driving voltage $V_{d1}$ is supplied, for example, to the first subset of electrodes of the first set of driving electrodes 17a and to the first subset of electrodes of the second set of driving electrodes 17b, whereas the second driving voltage $V_{d2}$ is supplied, for example, to the second subset of electrodes of the first set of driving electrodes 17a and to the second subset of electrodes of the second set of driving electrodes 17b. Furthermore, the first and second driving voltages $V_{d1}$, $V_{d2}$ have a frequency equal to the aforementioned frequency $f_d$, but have opposite phases.

The MEMS gyroscope 1 further comprises a first conductive plate 28 and a second conductive plate 30, which are set underneath (in the direction of the axis z) of the first and second mobile masses 6, 8, respectively. In this connection, in FIG. 2 the arrangement of the blocks that represent the first and second conductive plates 28, 30 does not have any geometrical implication.

In particular, the first conductive plate 28 is fixed to the frame 4 and is aligned to the first mobile mass 6 parallel to the axis z. Furthermore, the first mobile mass 6 may also move parallel to the axis z. Consequently, the first conductive plate 28 forms, together with the first mobile mass 6, a third variable capacitor.

The second conductive plate 30 is fixed to the frame 4 and is aligned to the second mobile mass 8 parallel to the axis z. In addition, the second mobile mass 8 may also move parallel to the axis z. Consequently, the second conductive plate 30 forms, together with the second mobile mass 8, a fourth variable capacitor.

Assuming that the MEMS gyroscope 1 is subjected to a rotation directed parallel to the axis y, the first and second mobile masses 6, 8 are subjected to Coriolis forces, which have approximately the same modulus (on the hypothesis that the first and second mobile masses have the same mass) and are directed parallel to the axis z, with opposite directions, since the first and second mobile masses 6, 8 move parallel to the axis x at velocities in phase opposition. In what follows, it is assumed, for simplicity, that the angular velocity of the MEMS gyroscope 1, and thus of the first and second dice 2, 22, is constant.

In practice, the velocity of the first and second mobile masses 6, 8 does not only include components parallel to the axis x in phase opposition with respect to one another, but also components directed parallel to the axis z (also known as "sensing direction") and in phase opposition with respect to one another, these latter components indicating the angular velocity to which the frame 4 is subjected and also having a frequency equal to the aforementioned frequency $f_d$.

The MEMS gyroscope 1 further comprises a processing stage 35, which is formed in the second die 22, is electrically connected to the first and second conductive plates 28, 30 and is designed to transduce the capacitance of the third and fourth variable capacitors into a quantity proportional to the angular velocity to which the MEMS gyroscope 1 is subjected.

In practice, the MEMS gyroscope 1 implements a differential sensing scheme. In fact, the first and second driving voltages $V_1$, $V_{d2}$ may be viewed as differential components of a driving signal, which is applied to the oscillating system to excite the aforementioned mode of oscillation. Likewise, on the hypothesis that the system of driving electrodes 16 and the system of sensing electrodes 18 are such that the capacitances of the first and second variable capacitors are respectively equal, substantially, to $C_{const}+\Delta C$ and $C_{const}-\Delta C$, with $C_{const}$ constant and $\Delta C$ that varies in time in a sinusoidal way with a frequency equal to the frequency $f_d$, the variations of capacitance of the first and second variable capacitors form differential components of the aforementioned first sensing signal, which indicates the positions (and velocities) along the axis x of the first and second mobile masses 6, 8. In addition, on the hypothesis that the capacitances of the third and fourth variable capacitors are respectively equal, substantially, to $C'_{const}+\Delta C'$ and $C'_{const}-\Delta C'$, with $C'_{const}$ constant and $\Delta C'$ that varies in time in a sinusoidal way with a frequency equal to the frequency $f_d$, the variations of capacitance of the third and fourth variable capacitors form differential components of a second sensing signal, which indicates the positions (and velocities) along the axis z of the first and second mobile masses 6, 8. This second sensing signal is supplied to the processing stage 35, which transduces it into the aforementioned quantity proportional to the angular velocity to which the MEMS gyroscope 1 is subjected.

Figure 2:
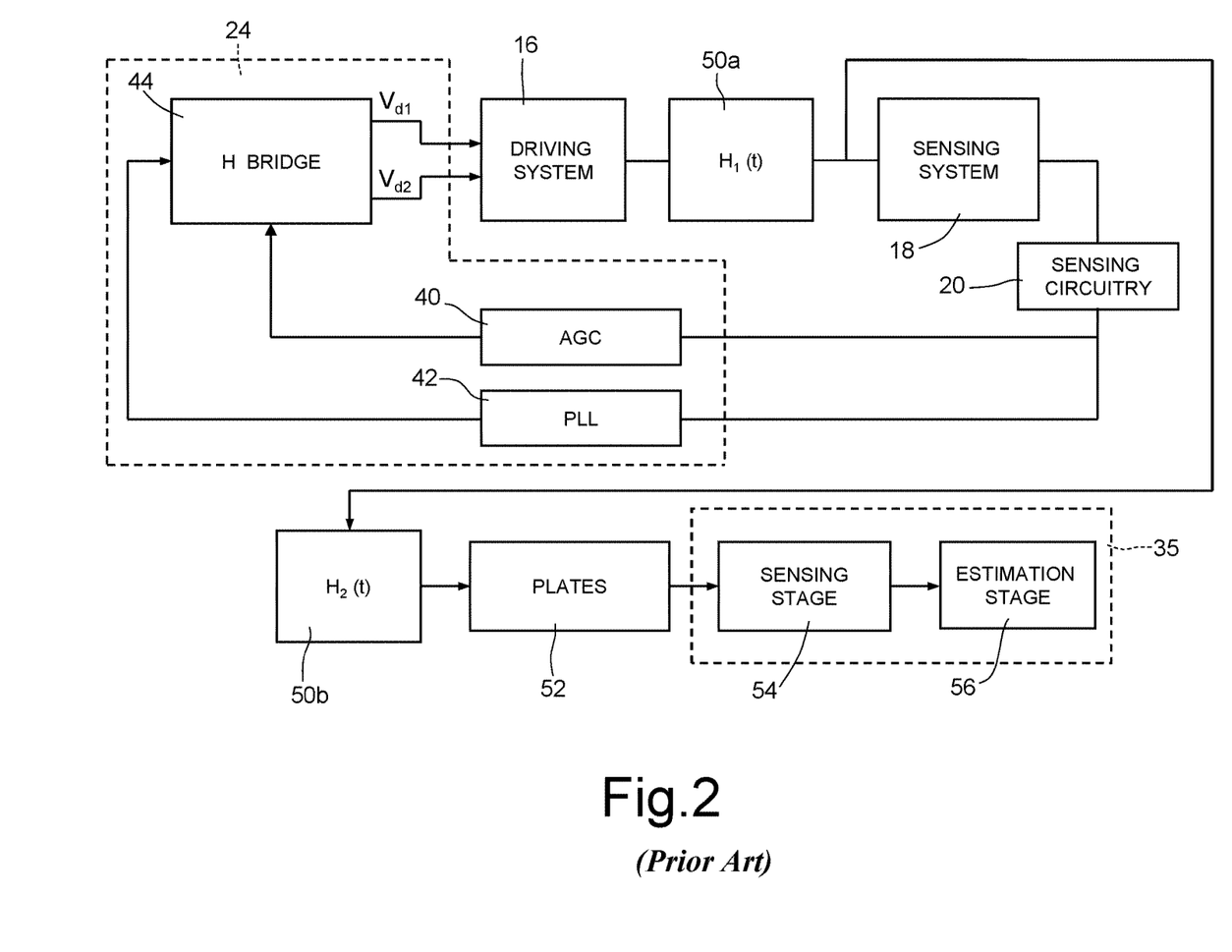
FIG. 2 shows a further block diagram regarding the gyroscope illustrated in FIG. 1.

Irrespective of the considerations regarding the differential nature of the signals generated in the MEMS gyroscope 1, the external driving circuitry 24 comprises, as illustrated in FIG. 2, a gain circuit 40, a phase-locked loop (PLL) 42 and an H-bridge circuit 44.

In detail, the gain circuit 40 is connected, at input, to the external sensing circuitry 20 and thus to the system of sensing electrodes 18. The gain circuit 40 receives at input the first sensing signal and generates a regulation signal, which is supplied on a first input of the H-bridge circuit 44.

The phase-locked loop 42 is also connected to the external sensing circuitry 20 for receiving the first sensing signal. Further the phase-locked loop 42 generates a phase-locked signal, which is supplied on a second input of the H-bridge circuit 44. The phase-locked signal has its phase locked to the phase of the velocity or else of the position of either the first mobile mass 6 or the second mobile mass 8. In what follows, it is assumed that the phase-locked signal has its phase locked to the phase of the position of the first mobile mass 6.

The H-bridge circuit 44 generates, on the basis of the phase-locked signal and of the regulation signal, the first and second driving voltages $V_1$, $V_{d2}$, which are applied to the electrodes of the system of driving electrodes 16, as described previously.

The following relation applies:

$$X_{drive}=X_0 \sin(\omega_d t)$$

where: $X_{drive}$ is the position (equivalently, the displacement), measured parallel to the axis x, assumed by the first mobile mass 6 or by the second mobile mass 8 (in what follows, for convenience, reference will be made to just the first mobile mass 6) with respect to a corresponding resting position; $X_0$ is a constant amplitude value; t is the time variable; and $\omega_d$ is the pulsation at which the first mobile mass 6 oscillates parallel to the axis x, i.e., $\omega_d=2\pi f_d$. Furthermore, in these conditions, the Coriolis force that acts on the first mobile mass 6 is:

$$F_{Coriolis}=-2m\dot{X}_{drive}\times\Omega$$

where $\dot{X}_{drive}$ is the velocity of the first mobile mass 6 parallel to the axis x, and $\Omega$ is the angular velocity to which the MEMS gyroscope 1 is subjected. Consequently, assuming that the first sensing signal is directly proportional to $X_{drive}$ and that the second sensing signal is directly proportional to the deviation, measured parallel to the axis z, of the first mobile mass 6 with respect to the corresponding resting position, it is found that the second sensing signal is phase shifted by 90° with respect to the first sensing signal. Furthermore, in order to guarantee that the frequency $f_d$ is substantially equal to the resonance frequency of the oscillating system, the phase-locked signal has a phase equal to the sum of the phase of the first sensing signal and of a deviation equal to 270°, since a further phase shift of approximately 90° is present between the phases of the driving signal (assumed as coinciding with the phase of the first driving voltage $V_{d1}$) and the phase of $X_{drive}$.

In greater detail, the gain circuit 40 is a variable-gain circuit, which forms a gain-control loop together with the H-bridge circuit 44, the system of driving electrodes 16, the oscillating system (the latter in FIG. 2 is represented by a block 50a that indicates the mechanical transfer function $H_1(t)$ of the oscillating system for the driving mode, i.e., parallel to the driving direction), the system of sensing electrodes 18, and the external sensing circuitry 20. The gain-control loop is such that the aforementioned value $X_0$ is substantially constant, as mentioned previously, as well as being close to a reference value.

As shown once again in FIG. 2, the oscillating system also has a mechanical transfer function $H_2(t)$ for the sensing mode (i.e., parallel to the sensing direction), which sets in relation the displacements of the first and second mobile masses 6, 8 parallel to the axis z (and thus the second sensing signal) with the Coriolis force that acts, in opposite directions, on the first and second mobile masses 6, 8. In this connection, in FIG. 2 the behaviour of the oscillating system parallel to the axis z is represented by a block 50b that indicates the mechanical transfer function $H_2(t)$. In other words, in FIG. 2 the oscillating system has been divided into:

- a first portion (designated by 50a), which is forced electrostatically by the system of driving electrodes 16 for getting the oscillating system to oscillate parallel to the axis x, this oscillation entailing periodic variations of the capacitances of the first and second variable capacitors, as indicated by the first sensing signal; and
- a second portion (designated by 50b), which, when the MEMS gyroscope 1 is subjected to rotation parallel to the axis y, causes an oscillation of the first and second mobile masses 6, 8 parallel to the axis z, the amount of this oscillation being a function, among other things, of the velocity of the first and second mobile masses 6, 8 parallel to the axis x and of the angular velocity to which the MEMS gyroscope 1 is subjected.

The output of the block 50b is connected to a system of plates 52, which is formed by the first and second conductive plates 28, 30 (illustrated in FIG. 1). Furthermore, the processing stage 35 comprises a sensing stage 54 and an estimation stage 56.

The sensing stage 54 is connected, at input, to the system of plates 52 and generates the aforementioned second sensing signal as a function of the variations of capacitance of the third and fourth variable capacitors. The output of the sensing stage 54 is connected to the input of the estimation stage 56, which transduces the second sensing signal into the aforementioned quantity proportional to the angular velocity to which the MEMS gyroscope 1 is subjected.

This having been said, today one of the most important parameters for evaluating the goodness of a MEMS gyroscope is represented by the stability, i.e., by the possibility of having a sensitivity that is as low as possible with respect to undesirable conditions, such as variations in temperature and/or humidity, or else with respect to stresses imposed by the process of soldering the gyroscope on the corresponding printed-circuit board (PCB).

In greater detail, the stability of MEMS gyroscopes is limited by the so-called quadrature error, which represents the error caused by undesired couplings between the so-called driving mode of the oscillating system (in the example of FIG. 1, directed parallel to the axis x and excited by the driving signal) and the so-called sensing mode (or modes) of the oscillating system (in the example of FIG. 1, directed parallel to the axis z).

In still greater detail, on account of the inevitable manufacturing imprecisions, following upon the movement in the driving direction of each of the first and second mobile masses 6, 8, there occurs a movement (referred to as quadrature movement) of each of the first and second mobile masses 6, 8 in the sensing direction, in a way independent of the Coriolis force. This movement in the sensing direction represents a sort of spurious component that is superimposed upon the component caused by the Coriolis force.

As is known, the spurious movement is periodic with a frequency equal to the frequency $f_d$ and in phase with $X_{drive}$ and thus with the first sensing signal. Further, the spurious movement has an amplitude that is far from negligible since the latter may be a couple of orders of magnitude higher than the full scale of the gyroscope. More in particular, the spurious movement is equivalent to the movement induced by a hypothetical quadrature force:

$$F_{quad}=KX_{drive}$$

where K is a coupling coefficient between the sensing mode and the driving mode.

In practice, the second sensing signal available downstream of the sensing stage 54 may be viewed as the sum of a Coriolis signal, directly proportional to the Coriolis force and thus to the angular velocity to which the MEMS gyroscope 1 is subjected, and of a quadrature signal, which represents a disturbance caused by the quadrature error and is independent of the Coriolis force.

The estimation stage 56 carries out an amplitude demodulation of a coherent type and in phase with the second sensing signal in order to filter the quadrature signal and bring the Coriolis signal down to baseband. However, on account of the demodulation technique adopted, even a small error in the phase of the coherent signal used for demodulation entails a non-negligible projection of the quadrature signal on the output signal, where by "output signal" is meant a signal supplied by the estimation stage 56 and proportional to the angular velocity to which the MEMS gyroscope 1 is subjected. Since the changes of temperature and/or humidity and the mechanical stresses induced by the soldering process may change the relations between the phases of the signals used in the demodulation process, over time there may occur drops in performance of the gyroscope.

In order to reduce at least in part the negative effects of the quadrature signal, gyroscopes have been developed with mechanical designs such as to reduce the aforementioned spurious movements, the results being, however, only partially satisfactory.

BRIEF SUMMARY

At least one embodiment of the present disclosure is t a MEMS gyroscope that enables the drawbacks of the known art to be overcome at least in part.

According to at least one embodiment of the present disclosure, a MEMS gyroscope includes a driving stage configured to cause a first mobile mass to oscillate with displacements parallel to a first direction, the driving stage being configured to modulate a frequency of the displacements; and a processing stage configured to generate an output signal indicating an angular velocity of the MEMS device as a function of displacements of the first mobile mass parallel to a second direction, when driven by the driving stage, on account of a Coriolis force.

BRIEF DESCRIPTION OF THE SEVERAL VIEWS OF THE DRAWINGS

For a better understanding of the present disclosure, preferred embodiments thereof are now described, purely by way of non-limiting example with reference to the attached drawings, wherein.

DETAILED DESCRIPTION

The present gyroscope stems from an idea of the present Applicant, who has noted how it is possible to separate in frequency the Coriolis signal and the quadrature signal. In this way, filtering of the quadrature signal may be rendered independent of undesirable effects such as variations in temperature and humidity.

Figure 3:
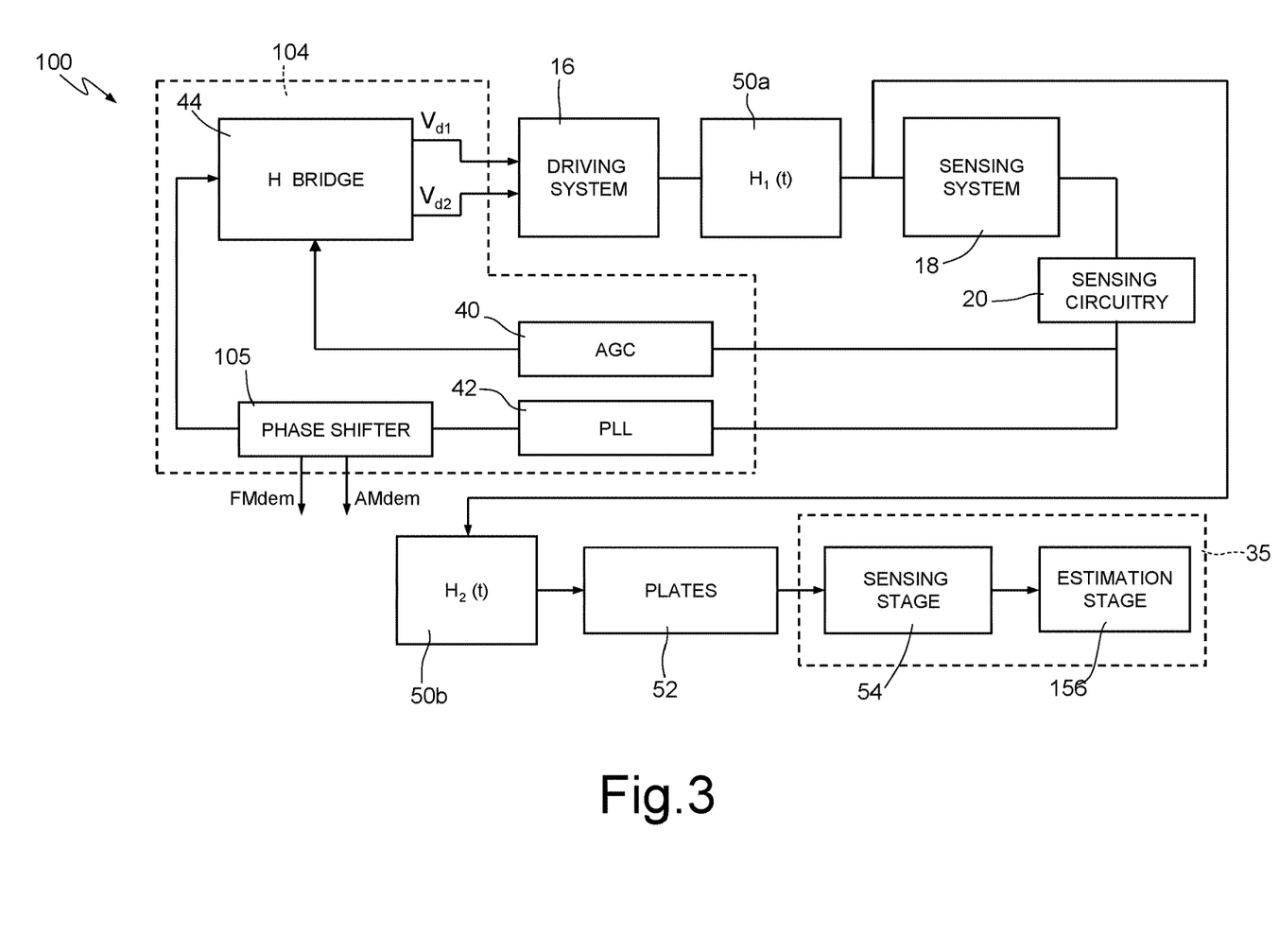
FIG. 3 shows a block diagram regarding the present MEMS gyroscope.

In greater detail, in what follows, reference will be made to the MEMS gyroscope 100 illustrated in FIG. 3, in which components already present in the MEMS gyroscope 1 illustrated in FIGS. 1 and 2 are designated by the same references, except where otherwise specified. Furthermore, in what follows, the MEMS gyroscope 100 is described limitedly to the differences with respect to the MEMS gyroscope 1 illustrated in FIGS. 1 and 2.

In detail, the present Applicant has noted how the external driving circuitry (designated by 104 in FIG. 3) may generate the driving signal so that $$X_{drive} = X_0 \sin(\omega_d t + \varphi_0 \sin(\omega_f t))$$

where: $X_{drive}$ is once again the deviation (measured parallel to the axis x) of either the first mobile mass 6 or the second mobile mass 8 with respect to a corresponding resting position; $\varphi_0$ is a parameter upon which the amount of the modulation depends; and $\omega_f$ is a modulation pulsation, with $\omega_f = 2\pi f_f$ and $f_f < f_d$. For instance, $f_d = 5$ kHz and $f_f = 500$ Hz.

In practice, the phase of the harmonic displacement of each of the first and second mobile masses 6, 8 is modulated so that the displacement, and thus the position of the corresponding mobile mass, is frequency modulated, with a sinusoidal modulating signal. For simplicity, in what follows reference will be made, except where otherwise specified, to the first mobile mass 6, even though the following considerations also apply to the second mobile mass 8.

The following formulas may further be verified:

$$\dot{X}_{drive} = X_0 \cos(\omega_d t + \varphi_0 \sin(\omega_f t))[\omega_d + \varphi_0 \omega_f \cos(\omega_f t)]$$

$$F_{Coriolis} = -2m X_0 [\omega_d + \varphi_0 \omega_f \sin(\omega_f t)]\Omega.$$

In other words, the velocity of the first mobile mass 6, and thus also the Coriolis force, depends directly upon a gain $[\omega_d + \varphi_0 \omega_f \cos(\omega_f t)]$ of a time-variable type. Equivalently, the Coriolis force, and thus also the Coriolis signal supplied by the sensing stage 54, is modulated both in amplitude and in frequency.

As regards, instead, the quadrature force, it has a constant amplitude. In fact, the gain-control loop continues to keep the value $X_0$, and thus the amplitude of the deviation (measured parallel to the axis x) of the first mobile mass 6 from the respective resting position, substantially constant. The amplitude of the quadrature force is thus equal to $KX_0$. In other words, the quadrature force, and thus also the quadrature signal, is modulated only in frequency.

In order to obtain the modulations described above, the external driving circuitry 104 comprises a phase shifter 105, the input of which is connected to the output of the phase-locked loop 42 for receiving the phase-locked signal generated thereby. Furthermore, a main output of the phase shifter 105 is connected to the second input of the H-bridge circuit 44.

In detail, the phase shifter 105 generates on its own main output a phase-shifted signal, which is supplied on the second input of the H-bridge circuit 44, instead of the phase-locked signal.

Figure 4:
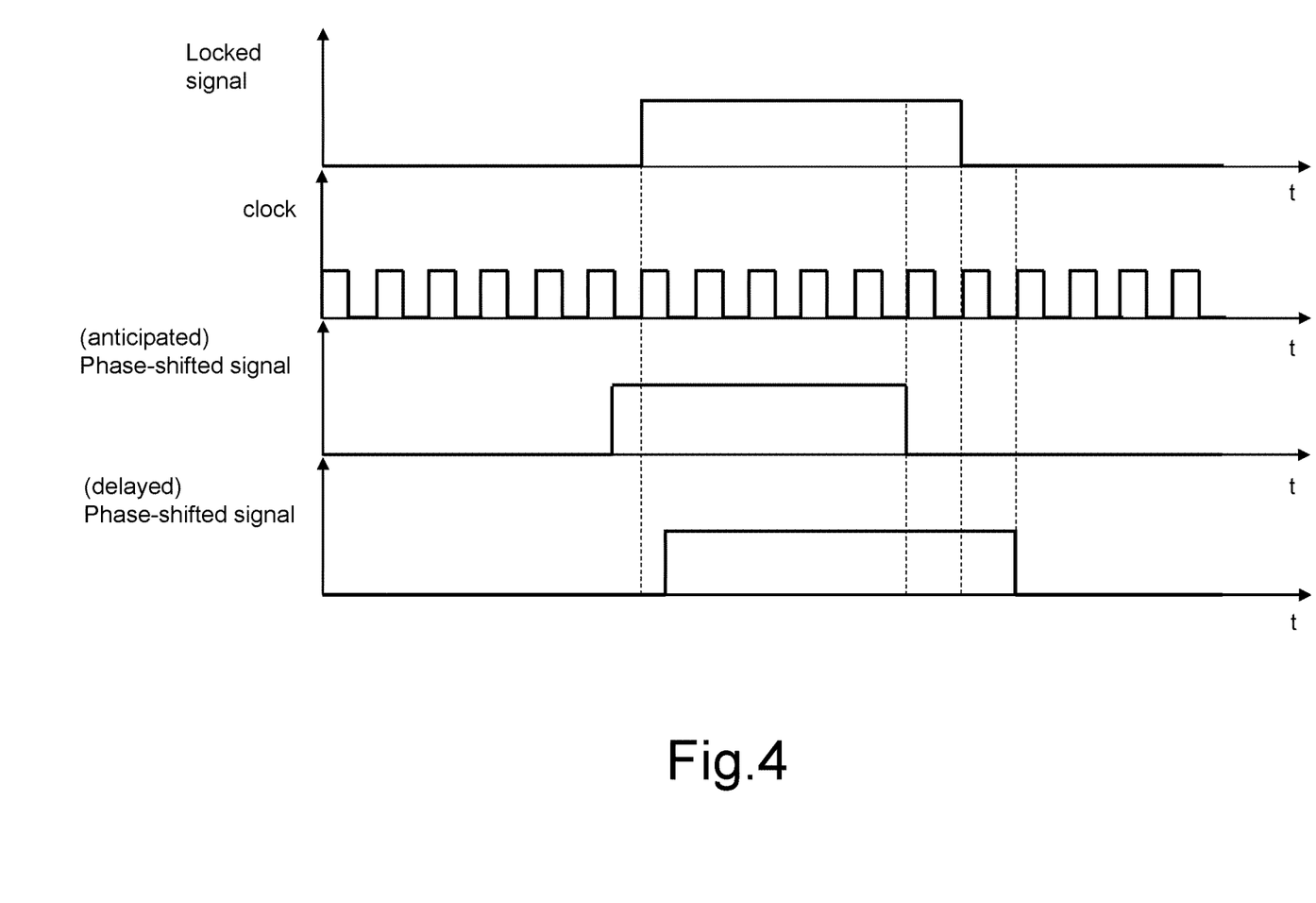
FIGS. 4, 5, and 7 show time plots of signals generated within the present MEMS gyroscope.

In greater detail, the phase shifter 105 applies a variable time delay to the phase-locked signal, this delay being equal in modulus to $\varphi_0 \sin(\omega_f t)$. For this purpose, the phase-locked loop 42 may, for example, operate with a respective clock having a frequency $f_{clock} \gg f_d$ (for example, $f_{clock} = 10000 \cdot f_d$). Furthermore, assuming that the phase-locked signal generated by the phase-locked loop 42 is a square-wave signal with a duty cycle of 50%, to delay/anticipate this signal the phase shifter 105 may subtract/add one or more clock beats to the duration of the half-period with a zero value of the phase-locked signal, as illustrated, for example, in FIG. 4. Purely by way of example, in FIG. 4 it has been assumed that $f_{lock} = 12 \cdot f_d$, for simplicity of representation.

Figure 5:
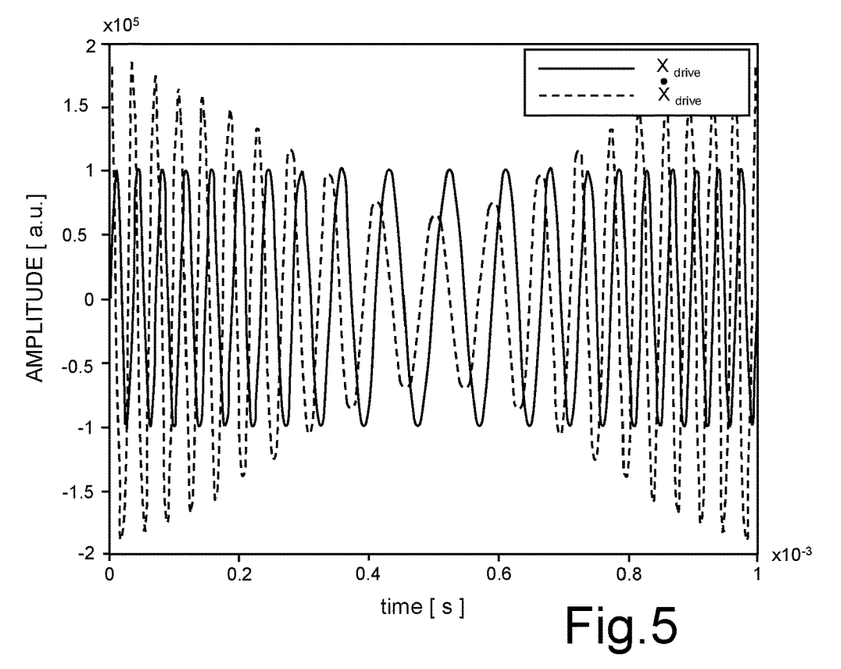

In practice, by varying sequentially the number of clock beats on which the half-periods with zero value of the phase-locked signal extend, the phase shifter 105 generates the phase-shifted signal. In addition, since the phase-shifted signal is supplied on the second input of the H-bridge circuit 44, also the driving signal is phase-shifted, with respect to the phase-locked signal, by $\varphi_0 \sin(\omega_f t)$ so that the oscillation of the oscillating system is frequency modulated. In particular, in what follows it is assumed that the first driving voltage $V_{d1}$ is phase shifted by $\varphi_0 \sin(\omega_f t)$ with respect to the phase-locked signal. FIG. 5 shows, by way of example, the plots of $X_{drive}$ and of the corresponding derivative $\dot{X}_{drive}$.

Figure 6:
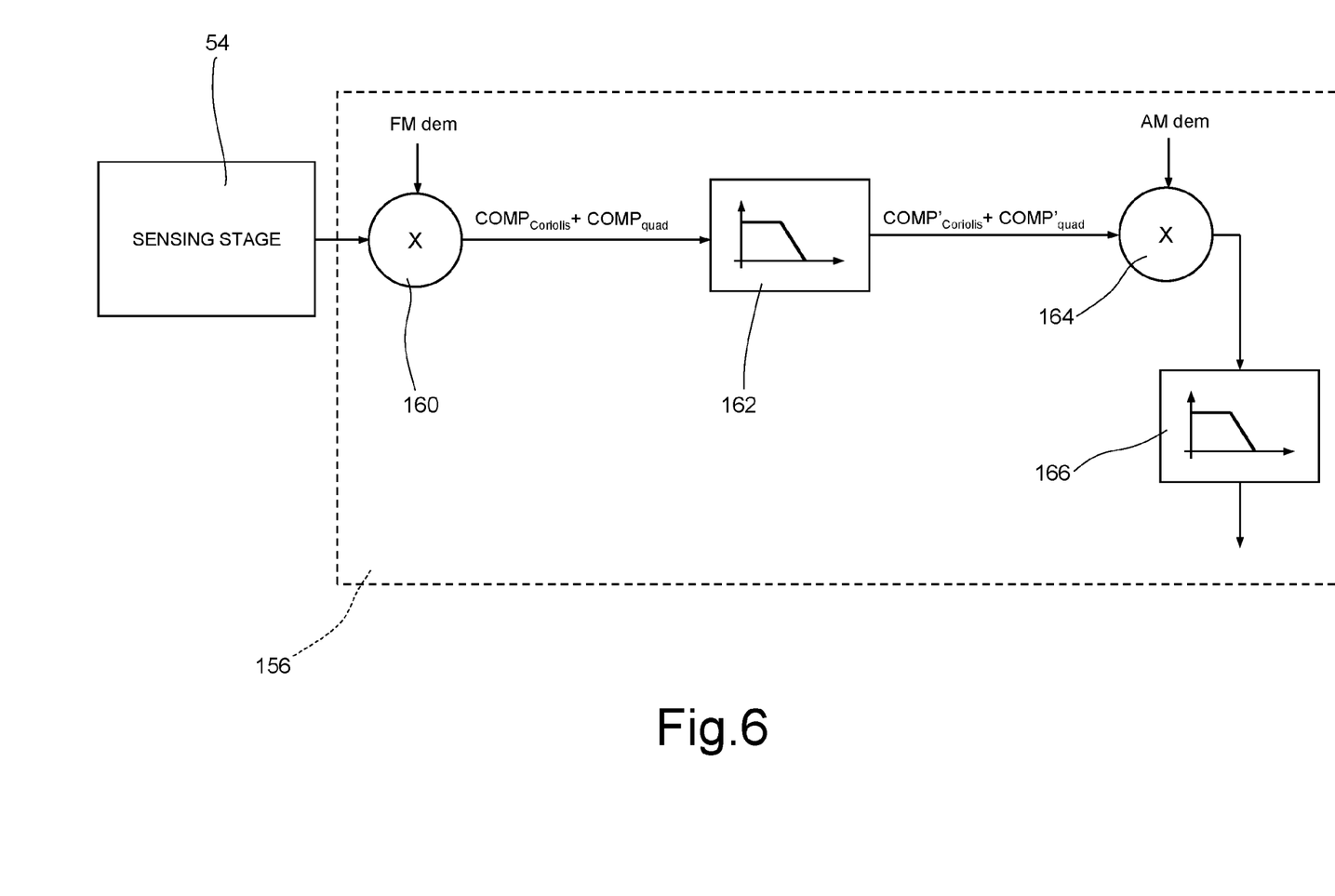
FIG. 6 shows a block diagram regarding operations performed by a portion of the present MEMS gyroscope.

As regards, instead, the estimation stage (designated by 156 in FIG. 3), it implements what is illustrated in FIG. 6.

In detail, the estimation stage 156 comprises a first demodulation stage 160, which has a first input connected to the output of the sensing stage 54, and a first filtering stage 162, the input of which is connected to the output of the first demodulation stage 160.

In greater detail, the first demodulation stage 160 receives on its own first input the second sensing signal, which, as explained previously, comprises the Coriolis signal and the quadrature signal. In addition, the first demodulation stage 160 has a second input, on which it receives a signal FMdem=$\cos(\omega_d t + \theta + \varphi_0 \sin(\omega_f t))$, where $\theta$ is a phase shift of the demodulating signal, which possibly enables recovery of any phase offsets introduced by the electronics and due to constructional tolerances. For instance, the signal FMdem may be generated by the phase shifter 105 on a first secondary output of its own, to which the second input of the first demodulation stage 160 is connected.

Figure 7:
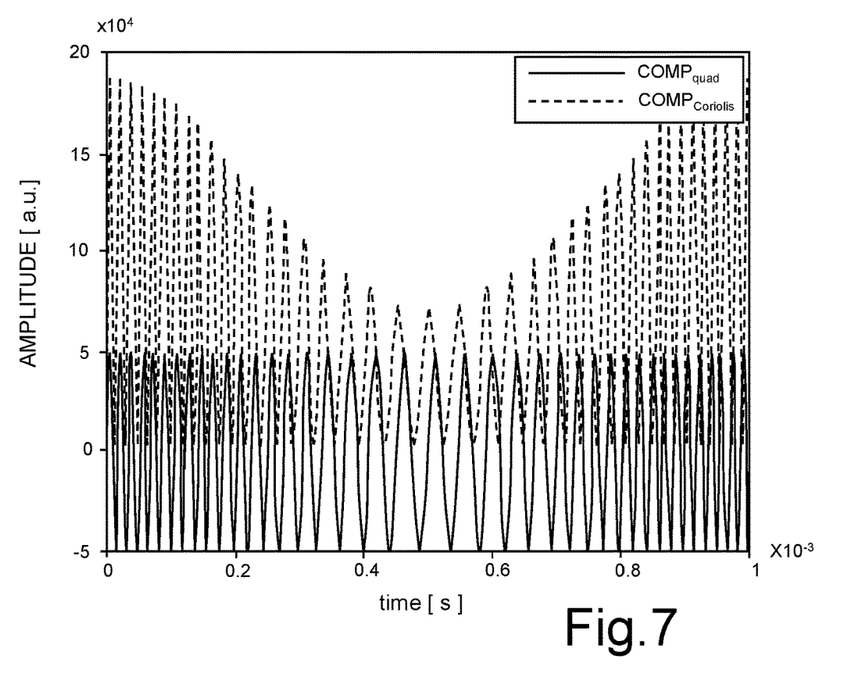

The first demodulation stage 160 multiplies the second sensing signal by the signal FMdem for supplying at output a first demodulated signal including a first component $COMP_{Coriolis}$, equal to $F_{Coriolis} \cdot H_2(t) \cdot FMdem$, and a second component $COMP_{quad}$, equal to $F_{quad} \cdot H_2(t) \cdot FMdem$. Examples of plots of the first and second components $COMP_{Coriolis}$, $COMP_{quad}$ are illustrated in FIG. 7.

In turn, the first filtering stage 162 is a filter of a low-pass type, which filters the first demodulated signal for cutting off the components of the first demodulated signal having frequencies higher than the frequency $f_f$ (in particular, it may be shown that there are present components at a frequency equal to $2 \cdot f_d$, which are cut off). The first filtering stage 162 thus generates a first filtered signal, which includes a respective first component $COMP'_{Coriolis}$, equal to $K_1[\omega_d + \varphi_0 \, \omega_f \cos(\omega_f t)]$ (with $K_1$ constant that depends upon the Coriolis force, but not upon the quadrature force, $K_1$ thus being a function, among other things, of $H_2(t)$ and being directly proportional to the angular velocity $\Omega$), and a respective second component $COMP'_{quad}$, equal to $K_2$ (which is constant and depends upon the quadrature force).

The estimation stage 156 further comprises a second demodulation stage 164 and a second filtering stage 166.

In detail, the second demodulation stage 164 has a first input connected to the output of the first filtering stage 162 for receiving the first filtered signal. Further, the second demodulation stage 164 has a second input, on which it receives a signal $AMdem = \cos(\omega_f t)$, which is generated, for example, by the phase shifter 105 on a second secondary output of its own, to which the second input of the second demodulation stage 164 is connected.

The second demodulation stage 164 multiplies the first filtered signal by the signal AMdem, and consequently carries out an amplitude demodulation of the first filtered signal, generating a second demodulated signal, which is filtered by the second filtering stage 166, which carries out a low-pass filtering with a cutoff frequency lower than the frequency $f_f$, for keeping only a baseband component (i.e., a substantially d.c. component) of the second demodulated signal, which, as may be shown, is directly proportional to $K_1$ (and thus, to the angular velocity $\Omega$) and does not depend upon the quadrature force. In this connection, the first term of the second demodulated signal that depends upon the quadrature force is around the frequency $f_f$.

From what has been described and illustrated previously, the advantages that the present solution affords emerge clearly.

In particular, the present MEMS gyroscope enables separation in frequency of the quadrature signal and the Coriolis signal. In this way, the quadrature signal may be filtered in an extremely effective way, improving the stability of the gyroscope with respect to undesirable phenomena such as the variations of temperature and humidity.

In conclusion, it is clear that modifications and variations may be made to what has been described and illustrated so far, without thereby departing from the scope of the present disclosure.

In general, as mentioned previously, the modulation technique implemented by the present gyroscope is irrespective of the type, number, shape, and arrangement of the electrodes of the system of driving electrodes 16 and of the system of sensing electrodes 18, as likewise of the shape and arrangement of the first and second conductive plates 28, 30, which on the other hand may also be replaced by corresponding systems of electrodes. More in general, the detections of the positions and of the displacements of one or more of the mobile masses may be made by sensors of a non-capacitive type, such as piezoelectric, piezoresistive, or magnetic sensors. Furthermore, the first and second mobile masses may be driven in a non-electrostatic way.

In addition, embodiments are possible in which one or more of the signals mentioned previously is of a single-ended, instead of differential, type. For instance, it is possible for the first and second mobile masses 6, 8 to be driven just by the first driving voltage $V_{d1}$, in which case the H-bridge circuit 44 is absent and each of the first and second set of driving electrodes 17a, 17b includes only the respective first subset of electrodes. Likewise, each of the first and second sensing signals may be of a single-ended type; for example, with reference to the first sensing signal, it may depend upon the capacitance of just one of the first and second variable capacitors. More in general, one or more of the signals mentioned previously may include a non-zero common-mode component, even though purely differential signals guarantee a reduced sensitivity with respect to undesirable phenomena (for example, accelerations directed parallel to the driving and sensing directions).

Further possible are embodiments in which in the first die 2 just one mobile mass is present, which is made to oscillate along one or two axes. The movements of the mobile mass along a further axis perpendicular to the aforementioned one or two axes once again indicate the Coriolis force and thus the rotation to which the MEMS gyroscope 1 is subjected.

Finally, generation of the phase-shifted signal may be performed place in a way different from what has been described. Further, the phase shifter 105 and the phase-locked loop 42 may form a single circuit.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A MEMS device comprising:
 a driving circuit configured to cause a first mobile mass to oscillate with displacements parallel to a first direction, the driving circuit being configured to modulate a frequency of the displacements parallel to the first direction; and
 a processing stage configured to generate an output signal indicating an angular velocity of the MEMS device as a function of displacements of the first mobile mass parallel to a second direction, when driven by the driving circuit, on account of a Coriolis force, wherein said driving circuit is configured to drive the first mobile mass in a way that frequency modulates said displacements parallel to the first direction with a harmonic modulating signal.

2. The MEMS device according to claim 1, comprising sensing circuitry configured to generate a first sensing signal indicating a position of the first mobile mass in the first direction, wherein said driving circuit includes:
 a phase-locked stage configured to generate a control signal with a phase that is locked to a phase that is phase-shifted with respect to a phase of the first sensing signal; and
 a bridge circuit configured to force the displacements of the first mobile mass parallel to the first direction with a driving force having a respective phase that depends upon the phase of said control signal.

3. The MEMS device according to claim 2, wherein said displacements parallel to the first direction vary in time according to a sinusoidal equation.

4. The MEMS device according to claim 2, wherein said driving circuit further comprises a gain-regulation stage, which is configured to regulate an amplitude of said driving force as a function of said first sensing signal so that the amplitude of said first sensing signal is substantially constant.

5. The MEMS device according to claim 2, wherein:
said Coriolis force depends upon a velocity of the first mobile mass parallel to the first direction and is frequency and amplitude modulated;
said processing stage comprises:
a sensing stage configured to generate a second sensing signal indicating said displacements parallel to the second direction, said second sensing signal including a Coriolis signal, which depends upon said Coriolis force, and a quadrature signal, which depends upon a quadrature force that acts on the first mobile mass and depends upon a position of the first mobile mass parallel to the first direction, said quadrature signal being frequency modulated; and
a first demodulation stage configured to generate first demodulated signal by multiplying the second sensing signal by a first demodulation signal, and perform a subsequent first low-pass filtering so that said first demodulated signal will include a first component, which depends upon said Coriolis force and is independent of said quadrature force, and a second component, which depends upon said quadrature force and is independent of said Coriolis force; and
said processing stage is configured to generate said output signal as a function of said first component.

6. The MEMS device according to claim 5, wherein:
said displacements parallel to the first direction vary in time according to a sinusoidal equation; and
said processing stage further comprises a second demodulation stage configured to generate said output signal by multiplying the first demodulated signal by a second demodulation signal, which is harmonic with the second pulsation, and a subsequent second low-pass filtering for translating said high-frequency subcomponent down to baseband.

7. The MEMS device according to claim 1, wherein said driving circuit is configured to drive the first mobile mass and a second mobile mass so that they oscillate, parallel to the first direction, in phase opposition.

8. The MEMS device according to claim 7, comprising sensing circuitry configured to generate a first sensing signal indicating a position of the first mobile mass in the first direction, wherein:
said driving circuit includes:
a phase-locked stage configured to generate a control signal with a phase that is locked to a phase that is phase-shifted with respect to a phase of the first sensing signal; and
a bridge circuit configured to force the displacements of the first mobile mass parallel to the first direction with a driving force having a respective phase that depends upon the phase of said control signal; and
said first sensing signal indicates positions of the first and second mobile masses.

9. A MEMS gyroscope comprising:
a first mobile mass; and
a driving circuit configured to cause the first mobile mass to oscillate with displacements parallel to a first direction, the driving circuit being configured to modulate a frequency of the displacements parallel to the first direction; and
a processing stage configured to generate an output signal indicating an angular velocity of the MEMS device as a function of displacements of the first mobile mass parallel to a second direction, when driven by the driving circuit, on account of a Coriolis force, wherein said driving circuit is configured to drive the first mobile mass in a way that frequency modulates said displacements parallel to the first direction with a harmonic modulating signal.

10. The MEMS gyroscope according to claim 9, comprising sensing circuitry configured to generate a first sensing signal indicating a position of the first mobile mass in the first direction, wherein said driving circuit includes:
a phase-locked stage configured to generate a control signal with a phase that is locked to a phase that is phase-shifted with respect to a phase of the first sensing signal; and
a bridge circuit configured to force the displacements of the first mobile mass parallel to the first direction with a driving force having a respective phase that depends upon the phase of said control signal.

11. The MEMS gyroscope according to claim 10, wherein said driving circuit further comprises a gain-regulation stage, which is configured to regulate an amplitude of said driving force as a function of said first sensing signal so that the amplitude of said first sensing signal is substantially constant.

12. The MEMS gyroscope according to claim 10, wherein:
said Coriolis force depends upon a velocity of the first mobile mass parallel to the first direction and is frequency and amplitude modulated;
said processing stage comprises:
a sensing stage configured to generate a second sensing signal indicating said displacements parallel to the second direction, said second sensing signal including a Coriolis signal, which depends upon said Coriolis force, and a quadrature signal, which depends upon a quadrature force that acts on the first mobile mass and depends upon a position of the first mobile mass parallel to the first direction, said quadrature signal being frequency modulated; and
a first demodulation stage configured to generate a first demodulated signal by multiplying the second sensing signal by a first demodulation signal, and perform a subsequent first low-pass filtering so that said first demodulated signal will include a first component, which depends upon said Coriolis force and is independent of said quadrature force, and a second component, which depends upon said quadrature force and is independent of said Coriolis force; and
said processing stage is configured to generate said output signal as a function of said first component.

13. The MEMS gyroscope according to claim 9, comprising a second mobile mass, wherein said driving circuit is configured to drive the first and second mobile masses so that they oscillate, parallel to the first direction, in phase opposition.

14. A method of determining an angular velocity of a gyroscope, comprising:

driving a first mobile mass of the gyroscope into oscillation with displacements parallel to a first direction, the driving including modulating a frequency of the displacements parallel to the first direction; and generating an output signal indicating the angular velocity of the gyroscope as a function of displacements of the first mobile mass parallel to a second direction, when driven into oscillation with displacements parallel to the first direction, on account of a Coriolis force, wherein said driving includes driving the first mobile mass in a way that frequency modulates said displacements parallel to the first direction with a harmonic modulating signal.

15. The method according to claim 14, comprising:

generating a first sensing signal indicating a position of the first mobile mass in the first direction, wherein the driving includes:

generating a control signal with a phase that is locked to a phase that is phase-shifted with respect to a phase of the first sensing signal; and forcing the displacements of the first mobile mass parallel to the first direction with a driving force having a respective phase that depends upon the phase of said control signal.

16. The method according to claim 15, comprising regulating an amplitude of said driving force as a function of said first sensing signal so that the amplitude of said first sensing signal is substantially constant.

17. The method according to claim 15, wherein said Coriolis force depends upon a velocity of the first mobile mass parallel to the first direction and is frequency and amplitude modulated; the method further comprising:

generating a second sensing signal indicating said displacements parallel to the second direction, said second sensing signal including a Coriolis signal, which depends upon said Coriolis force, and a quadrature signal, which depends upon a quadrature force that acts on the first mobile mass and depends upon a position of the first mobile mass parallel to the first direction, said quadrature signal being frequency modulated; and generating an intermediate signal by multiplying the second sensing signal by a first demodulation signal, and performing a subsequent first low-pass filtering so that said intermediate signal will include a first component, which depends upon said Coriolis force and is independent of said quadrature force, and a second component, which depends upon said quadrature force and is independent of said Coriolis force, said first component having a high-frequency subcomponent, said second component being a low-frequency component;

wherein generating said output signal includes generating said output signal as a function of said high-frequency subcomponent.

18. The method according to claim 15, wherein said displacements parallel to the first direction vary in time according to a sinusoidal equation having an argument that includes a linear term that is linear in time and a harmonic term that is harmonic in time; and wherein said time-variable phase shift depends upon said harmonic term.

* * * * *